3,746,577
INSECT REMOVAL METHOD
Ralph L. Copeland, Bryan, Ohio, assignor to The Raymond Lee Organization, Inc., New York, N.Y.
Filed Aug. 9, 1971, Ser. No. 170,013
Int. Cl. B08b 7/00
U.S. Cl. 134—4                                                4 Claims

ABSTRACT OF THE DISCLOSURE

A method of applying a solvent for the removal of flying insects from automobile bodies, applied preferably by means of a pressure spray, the solvent consisting of the combination of sodium carboxymethyl cellulose and water.

SUMMARY OF THE INVENTION

The purpose of my invention is to enable the removal of the bodies of flying insects from autmobile bodies without harm to the finish of the automobile body and without requiring rubbing or scrubbing which would remove the finish.

My method is to apply a solution of sodium carboxymethyl cellulose and water to the area requiring cleaning, preferably by means of a gas pressure powered spray. After drying of the sprayed film on the automobile body, the film and the bodies of the insects are removed by either wiping with a dry cloth, or by rinsing with water.

BRIEF DESCRIPTION OF THE DRAWING

The objects and features of the invention may be understood with reference to the following detailed description of an illustrative embodiment of the invention taken together with the accompanying drawing in which.

DESCRIPTION OF THE PREFERRED EMBODIMENT

Figure 1:
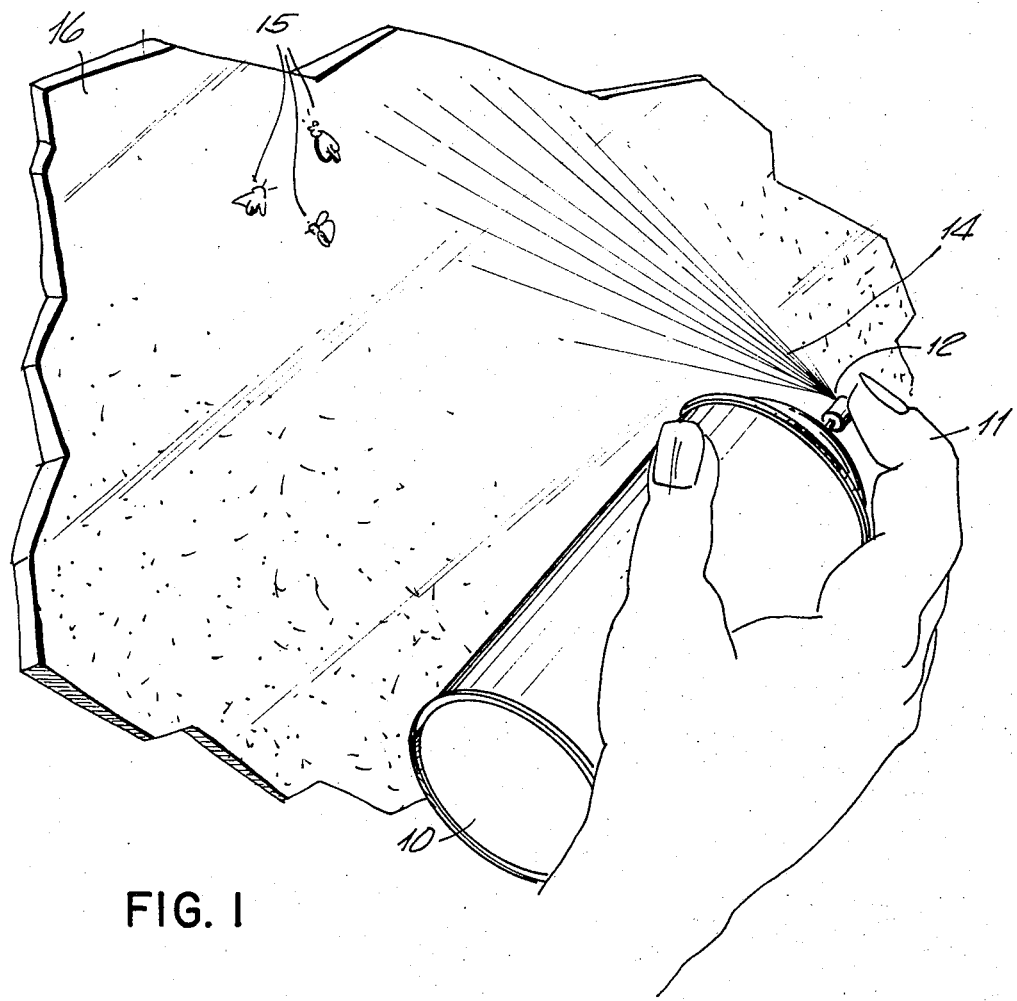
FIG. 1 is a perspective illustration of the method of removing insect bodies by means of a gas pressurized spray.
Figure 2:
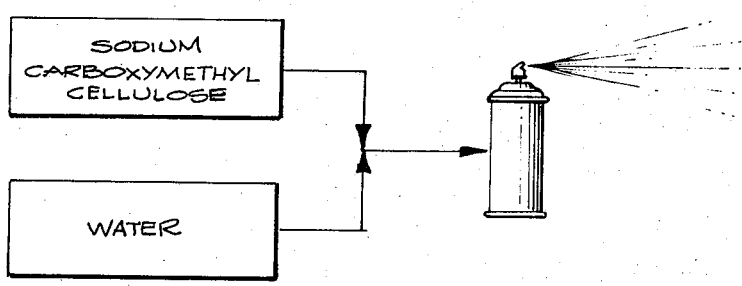
FIG. 2 is a block diagram of the steps taken to prepare the solution.

Turning now descriptively to the drawing, FIG. 1 illustrates the use of a gas pressure spray can, containing an inert gas under pressure and a solution of sodium carboxymethyl cellulose and water with means to spray the aforesaid solution when pressure applied by the finger 11 of the user pushes the spray button 12 to actuate valve such that the pressurized gas in the container 10 forces the solution in the form of a misty spray 14 onto the body of an automobile 16 containing the bodies of insects 15.

After the sprayed film has dried on the surface of the automobile, it is wiped off with a dry cloth or washed off with a water spray. The insect bodies are removed without any requirement of abrasive rubbing action, and there is no tendency to mar or scratch the finish of the automobile.

Since obvious changes may be made in the specific embodiment of the invention described herein without departing from the scope thereof, it is indicated that all matter contained herein is intended to be interpreted in an illustrative and not in a limiting sense.

I claim:

1. A method for the removal of insect bodies from the finish of automobiles, without requiring abrasion, so as to leave the finish of the automobile body unharmed, consisting of the steps of preparing a solution consisting essentially of sodium carboxymethyl cellulose and water, applying said solution to the body of the automobile, allowing time for the solution applied to dry to a film on the automobile body having insect bodies thereon, and then removing the film and entrapped insect bodies.

2. The method of removing insect bodies from the finish of automobiles as described in claim 1 in which the dry film is removed from the automobile body by spraying said automobile body with water.

3. The method of removing insect bodies from the finish of automobiles as described in claim 1 in which the solution of sodium carboxymethyl cellulose and water is applied as a spray from a pressurized container.

4. The combination as recited in claim 1 in which the film and entrapped matter is removed by a dry cloth.

References Cited

UNITED STATES PATENTS

| | | | |
|---|---|---|---|
| 2,221,968 | 11/1940 | Friedmann | 134—4 |
| 2,986,471 | 5/1961 | Rudd | 106—197 CX |
| 3,271,319 | 9/1966 | Morrison | 134—4 X |
| 3,313,648 | 4/1967 | Johnson | 134—4 X |

MORRIS O. WOLK, Primary Examiner

D. G. MILLMAN, Assistant Examiner

U.S. Cl. X.R.

252—Dig. 3